United States Patent
Hillesheim et al.

(10) Patent No.: US 10,065,893 B2
(45) Date of Patent: Sep. 4, 2018

(54) GYPSUM-CONTAINING COMPOSITION

(71) Applicant: BASF SE, Ludwigshafen (DE)

(72) Inventors: Nina Susanne Hillesheim, Trostberg (DE); Uwe Gehrig, St. Georgen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/561,096

(22) PCT Filed: Apr. 18, 2016

(86) PCT No.: PCT/EP2016/058557
§ 371 (c)(1),
(2) Date: Sep. 25, 2017

(87) PCT Pub. No.: WO2016/173874
PCT Pub. Date: Nov. 3, 2016

(65) Prior Publication Data
US 2018/0118624 A1    May 3, 2018

(30) Foreign Application Priority Data
Apr. 30, 2015  (EP) .................................... 15165842

(51) Int. Cl.
| | | |
|---|---|---|
| *C04B 28/14* | (2006.01) | |
| *C04B 28/16* | (2006.01) | |
| *C08F 28/04* | (2006.01) | |
| *C04B 24/16* | (2006.01) | |
| *C04B 111/60* | (2006.01) | |
| *C04B 111/00* | (2006.01) | |

(52) U.S. Cl.
CPC .......... *C04B 28/146* (2013.01); *C04B 24/165* (2013.01); *C04B 28/147* (2013.01); *C04B 28/165* (2013.01); *C08F 28/04* (2013.01); *C04B 2111/0062* (2013.01); *C04B 2111/60* (2013.01)

(58) Field of Classification Search
CPC ... C04B 28/146; C04B 28/147; C04B 28/165; C04B 24/165; C04B 2111/0062; C04B 2111/60; C08F 28/04
See application file for complete search history.

(56) References Cited

U.S. PATENT DOCUMENTS

| | | |
|---|---|---|
| 7,056,964 B2 | 6/2006 | Lettkeman et al. |
| 8,648,158 B2 | 2/2014 | Schwede et al. |
| 2010/0105810 A1 | 4/2010 | Sakamoto et al. |
| 2011/0190422 A1 | 8/2011 | Schwede et al. |
| 2012/0208949 A1 | 8/2012 | Sakamoto et al. |
| 2015/0344368 A1 | 12/2015 | Hesse et al. |

FOREIGN PATENT DOCUMENTS

| | | |
|---|---|---|
| DE | 2058120 A1 | 5/1972 |
| DE | 43 25 237 A1 | 2/1995 |
| DE | 102 43 361 A1 | 4/2004 |
| WO | WO 02/49983 A1 | 6/2002 |
| WO | WO 2008/123389 A1 | 10/2008 |
| WO | WO 2009/100956 A2 | 8/2009 |
| WO | WO 2014/114784 A1 | 7/2014 |

OTHER PUBLICATIONS

PCT/EP2016/058557—International Search Report, dated Jun. 28, 2016.
PCT/EP2016/056557—International Written Opinion, dated Jun. 28, 2016.
Extended European Search Report, EP Patent Application No. 15165842.4, dated Oct. 14, 2017.

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The invention relates to a composition comprising at least one binder based on calcium sulfate and at least one polymer obtainable by polymerization of monomers based on alkoxylates of S-vinylthioalkanols. Furthermore a molding, in particular a gypsum plasterboard, a gypsum wallboard, a screed or a knifing filler, obtained by setting of the composition of the invention is disclosed.

20 Claims, No Drawings

GYPSUM-CONTAINING COMPOSITION

CROSS REFERENCE TO RELATED APPLICATIONS

This application is a national stage application of International Application No. PCT/EP2016/058557, filed 18 Apr. 2016, which claims priority from European Patent Application No. EP 15165842.4, filed 30 Apr. 2015, which applications are incorporated herein by reference.

The present invention relates to a composition comprising at least one binder based on calcium sulfate and at least one polymer which comprises alkoxylates of S-vinylthioalkanols as monomers. The invention further provides moldings, in particular a gypsum plasterboard, a gypsum wallboard, a screed or a knifing filler, which are obtained by setting of the composition of the invention.

In general language usage, the term gypsum is used not only for the compound calcium sulfate dihydrate but also for the rock consisting of this compound and the corresponding building material, calcium sulfate hemihydrate or anhydrite. Calcium sulfate dihydrate occurs in nature in large deposits which have been formed on evaporation of seas in geological history. Furthermore, calcium sulfate dihydrate is obtained in industry as product or by-product in various processes, for example flue gas desulfurization in which sulfur dioxide is removed from the combustion off gases of coal power stations by means of a slurry of calcium carbonate or calcium hydroxide.

On heating to temperatures of 120-130° C., calcium sulfate dihydrate gives off part of its water of crystallization and is converted into calcium sulfate hemihydrate. When the hemihydrate is mixed with water, the dihydrate is formed again within a short time with hardening of the composition.

Calcium sulfate hemihydrate is an important binder for the production of mortars, knifing fillers, screeds, casting molds and in particular gypsum plasterboards. Furthermore, anhydride is used predominantly in anhydrite flow screeds which are pumped in various mortar consistencies into building works.

An important group of additives for these binders based on calcium sulfate are plasticizers which are used to aid the processability and in particular to improve the flowability. Ligninsulfonates, naphthalenesulfonates and/or melamine-formaldehyde-sulfite condensation products are frequently used as plasticizers in this field of application. These classes of compounds have been found to be useful industrially, but have the disadvantage that they maintain the processability only over a relatively short period of time.

The use of copolymers based on polycarboxylate ethers as plasticizers and consistency maintainers for binders based on calcium sulfate is likewise adequately known. Such copolymers consist essentially of an olefinically unsaturated monocarboxylic acid comonomer or an ester or a salt thereof and/or an olefinically unsaturated sulfonic acid comonomer together with a comonomer having a polyether function.

Polymeric plasticizers coat the surfaces of the binder components and thus bring about a greater flowability of the particles in the moist composition, as a result of which considerable amounts of make-up water can be saved. Reducing the amount of water also has the effect that the cured products obtained have an increased strength and density. A further advantage is that the water-gypsum values of the expensive α-form of the hemihydrate are approximated by the addition of copolymers based on polycarboxylate ethers to the preferred and far cheaper β-form.

U.S. Pat. No. 7,056,964 B2 describes a mixture which can be processed using a defined amount of make-up water to give a slurry which can be used as flow screed having a high strength. The mixture consists of a calcium sulfate hemihydrate in which at least 25% must be present in the β-form and a polycarboxylate plasticizer. The plasticizer is a copolymer of an oxyalkylene alkyl ether and an unsaturated dicarboxylic acid.

WO 0249983 describes the use of plasticizers based on polycarboxylate ethers as water-soluble copolymers for anhydrite-based flow screeds. The compounds described give good flow and leveling properties in the binder system and a relatively long processability.

DE 20 58 120 describes cationic polymers which comprise 2-hydroxyethyl vinyl sulfide and are prepared by means of a two-stage process. In a first step, 2-hydroxyethyl vinyl sulfide is polymerized, optionally together with comonomers such as acrylates. The (co)polymers obtained are reacted with alkylating agents in a second step, with the S atoms being alkylated to form sulfonium groups. Alkyl sulfates such as dimethyl sulfate, alkyl halides or alkylene oxides can be used as alkylating agents, with inorganic or organic acids having to be used in equimolar amounts when alkylene oxides are employed.

WO 2014114784 relates to an additive which can be used as curing accelerator for hydraulically setting compositions, which comprises a) at least one polymeric dispersant which comprises structural units having anionic or anionogenic groups and structural units having polyether side chains, with sulfur-containing side chains also being encompassed in the formula IIa), b) at least one specific sulfonic acid compound and c) calcium silicate hydrate particles.

Problems in production sometimes occur in the case of the polymers of the prior art. For example, allyl alcohol ethoxylates do not display particularly high reactivity upon polymerization or copolymerization and also lead to some secondary reactions. Isoprenol ethoxylates are likewise not very reactive and formation of isoprene can occur in the production process. Some of the alkoxylates, for example hydroxybutyl vinyl ether ethoxylates (HBVE ethoxylates) have only limited hydrolysis stability, especially in an acidic medium.

It was therefore an object of the present invention to provide dispersants having a high dosage efficiency for binder compositions based on calcium sulfate. A subobject of the invention was for the dispersants to be able to be prepared by an efficient polymerization reaction using monomers based on alkoxylates. A further subobject of the present invention was to provide alkoxylate monomers for this purpose, which both as monomers and in a form polymerized into the polymer have an increased hydrolysis stability, especially compared to hydroxybutyl vinyl ether ethoxylates.

This object was achieved by a composition comprising
A) at least one binder based on calcium sulfate and
B) at least one polymer obtainable by polymerization of monomers comprising an unsaturated compound of the general formula (I)

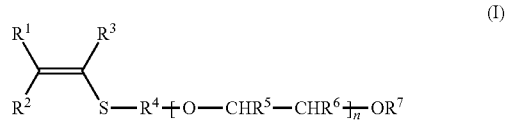

where

R$^1$, R$^2$, R$^3$ are identical or different and are each, independently of one another, H, CH$_3$, R$^4$ is linear or branched C$_1$-C$_{30}$-alkylene, R$^5$, R$^6$ are identical or different and are each, independently of one another, H, C$_1$-C$_{20}$-alkyl, C$_3$-C$_{15}$-cycloalkyl, aryl, —CH$_2$—O—C$_1$-C$_{20}$-alkyl, CH$_2$—O—C$_2$-C$_{20}$-alkenyl, where R$^5$ and R$^6$ can together also form a C$_3$-C$_6$-alkylene, R$^7$ is H, C$_1$-C$_4$-alkyl,

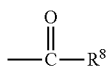

R$^8$ is C$_1$-C$_{22}$-alkyl, C$_2$-C$_{22}$-alkenyl, and n is an integer from 2 to 200.

It has surprisingly been found here that not only the stated object could be achieved in its full scope, but also that the dispersants of the invention have an excellent plasticizing effect, which can be seen from the dosage of the dispersant in order to achieve a particular measure of flow. In particular, a better dosage efficiency for binder compositions based on calcium sulfate compared to known dispersants of the prior art, for instance polyphosphate ethers based on methacrylate, could surprisingly be achieved.

In the context of the present invention, expressions of the form C$_a$-C$_b$ refer to chemical compounds or substituents having a particular number of carbon atoms. The number of carbon atoms can be selected from the entire range from a to b, including a and b; a is at least 1 and b is always greater than a. Further specification of the chemical compounds or the substituents is effected by expressions of the form C$_a$-C$_b$—V. Here, V is a class of chemical compounds or class of substituents, for example alkyl compounds or alkyl substituents.

In detail, the collective terms indicated for the various substituents have the following meanings:

C$_1$-C$_{22}$-Alkyl: straight-chain or branched hydrocarbon radicals having up to 22 carbon atoms, for example C$_1$-C$_{10}$-alkyl or C$_{11}$-C$_{22}$-alkyl, preferably C$_1$-C$_{10}$-alkyl, for example C$_1$-C$_3$-alkyl, such as methyl, ethyl, propyl, isopropyl, or C$_4$-C$_6$-alkyl, n-butyl, sec-butyl, tert-butyl, 1,1-dimethylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-trimethylpropyl, 1-ethyl-1-methylpropyl, 1-ethyl-2-methylpropyl, or C$_7$-C$_{10}$-alkyl, such as heptyl, octyl, 2-ethylhexyl, 2,4,4-trimethylpentyl, 1,1,3,3-tetramethylbutyl, nonyl or decyl and also isomers thereof.

C$_2$-C$_{20}$-Alkenyl: unsaturated, straight-chain or branched hydrocarbon radicals having from 2 to 20 carbon atoms and one, two or three, preferably one, double bond(s) in any position, for example C$_2$-C$_{10}$-alkenyl or C$_{11}$-C$_{20}$-alkenyl, preferably C$_2$-C$_{10}$-alkenyl such as C$_2$-C$_4$-alkenyl such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, or C$_5$-C$_6$-alkenyl, such as 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl or 1-ethyl-2-methyl-2-propenyl, and also C$_7$-C$_{10}$-alkenyl such as the isomers of heptenyl, octenyl, nonenyl or decenyl.

C$_1$-C$_{30}$-Alkylene: straight-chain or branched hydrocarbon radicals having from 1 to 30 carbon atoms, for example C$_1$-C$_{10}$-alkylene or C$_{11}$-C$_{20}$-alkylene, preferably C$_1$-C$_{10}$-alkylene, in particular methylene, dimethylene, trimethylene, tetramethylene, pentamethylene or hexamethylene.

C$_3$-C$_{15}$-Cycloalkyl: monocyclic, saturated hydrocarbon groups having from 3 to 15 ring carbons, preferably C$_3$-C$_8$-cycloalkyl such as cyclopropyl, cyclobutyl, cyclopentyl, cyclohexyl, cycloheptyl or cyclooctyl and also a saturated or unsaturated cyclic system such as norbornyl or norbenyl.

Aryl: a monocyclic to tricyclic aromatic ring system comprising from 6 to 14 ring carbons, e.g. phenyl, naphthyl or anthracenyl, preferably an aromatic ring system having one or two rings, particularly preferably a monocyclic aromatic ring system.

Preference is given to R$^4$ in the general formula (I) being a C$_2$-C$_4$-alkylene group, R$^5$, R$^6$ being identical or different and each being, independently of one another, a group selected from among H, —CH$_3$, —CH$_2$—CH$_3$, —C$_3$-C$_{11}$-alkyl, C$_{12}$-C$_{22}$-alkyl, phenyl, —CH$_2$—O—C$_1$-C$_{10}$-alkyl, CH$_2$—O—C$_2$-C$_{10}$-alkenyl, R$^7$ being H or C$_1$-C$_4$-alkyl and n being from 5 to 140.

In a preferred embodiment of the invention, the unsaturated compounds (I) are compounds of the general formula (Ia)

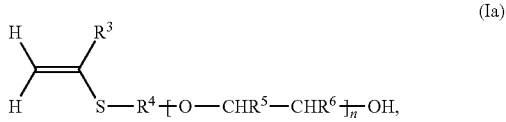

where R$^3$ is H or methyl, R$^4$ is a linear or branched C$_2$-C$_{10}$-alkylene group, preferably a linear C$_2$-C$_{10}$-group, in particular a linear or branched, preferably alinear C$_2$-C$_4$-alkylene group. Examples encompass 1,2-ethylene, 1,3-propylene and 1,4-butylene groups, and R$^4$ is very particularly preferably a 1,2-ethylene group —CH$_2$CH$_2$—.

The -[—O—CHR$^5$—CHR$^6$—]$_n$- group in the formula (Ia) is a polyalkoxy group comprising n alkoxy groups —O—CHR$^5$—CHR$^6$—, where the alkoxy groups can in each case be identical or different. R$^5$ and R$^6$ are each, independently of one another, preferably H, methyl or ethyl, particularly preferably H or methyl and very particularly preferably H, with the proviso that the sum of the carbon atoms in the radicals R$^5$ and R$^6$ is in each case from 0 to 2 per alkoxy group. In other words, the polyalkoxy group thus encompasses groups selected from the group consisting of ethoxy, propoxy and butoxy groups. If different alkoxy groups are present, these can be arranged in any order, for example randomly, in an alternating fashion or blockwise. In a preferred embodiment, at least 50 mol %, preferably at least 80 mol %, of the alkoxy groups are ethyoxy groups. The alkoxy groups are particularly preferably exclusively ethoxy groups, i.e. $R^5$ and $R^6$ are each H.

In the formula (Ia), n is a number from 5 to 160, particularly preferably from 10 to 140, very particularly preferably from 20 to 140 and for example from 20 to 30.

In a further particularly preferred embodiment of the invention, the unsaturated compounds (I) are compounds of the general formula (Ib),

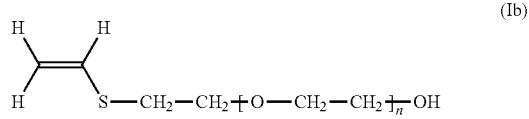

(Ib)

where n is from 20 to 140, preferably from 60 to 140.

The preparation of compounds (I), in particular the compounds of the formula (Ia), can be carried out, in particular, by alkoxylation of unsaturated compounds of the general formula (II)

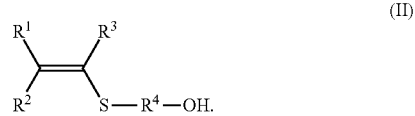

(II)

For this purpose, the compound (II) is reacted with the desired amount of alkylene oxides or alkylene ether oxides, in particular $C_2$-$C_4$-alkylene oxides, particularly preferably ethylene oxide.

The way in which an alkoxylation is carried out is known in principle to a person skilled in the art. Here, it is normally advisable to avoid acids as catalysts for the alkoxylation. In a preferred embodiment of the invention, the alkoxylation is a base-catalyzed alkoxylation. For this purpose, the compound (II) used as starting material can be admixed with basic catalysts, in particular alkali metal hydroxides, preferably potassium hydroxide, or with alkali metal alkoxides such as potassium methoxide in a pressure reactor.

However, the alkoxylation can also be carried out by means of other methods. For example, it is possible to use double hydroxide clays as described in DE 4325237 A1 or it is possible to use double metal cyanide catalysts (DMC catalysts). Suitable DMC catalysts are disclosed, for example, in DE 10243361 A1, especially in paragraphs [0029] to [0041] and also the literature cited there. For example, it is possible to use catalysts of the Zn—Co type. To carry out the reaction, it is possible to admix the alcohol $(R^1)(R^2)$—CH—$CH_2$—OH with the catalyst, dewater the mixture as described above and react it as described with the alkylene oxides. It is usual to use not more than 1000 ppm of catalyst based on the mixture and the catalyst can remain in the product due to this small amount. The amount of catalyst can in general be less than 1000 ppm, for example 250 ppm or less.

In a preferred embodiment of the invention, the polymers of the invention comprise at least one further monomer which is different from the compounds of the general formula (I) (further monomer). Of course, the polymer can also comprise a plurality of monomers which are different from the compounds of the general formula (I).

The at least one further monomer is particularly preferably a monoethylenically unsaturated monomer.

Suitable further monomers are $C_2$-$C_{24}$-alkenes, for example ethene, propene, 1-butene, 2-butene, isobutene, diisobutene, 1-hexene, 1-heptene, 1-octene, 1-nonene, 1-decene, 1-dodecene, 1-octadecene.

Other suitable further monomers are also conjugated $C_4$-$C_{10}$-dienes, for example butadiene, isoprene or chloroprene.

The further monomer, in particular monoethylenically unsaturated further monomer, can be, in particular, a monomer comprising at least one acid group, where the acid group can also be fully or partially neutralized. Here, the monomers can be, for in particular, alkali metal salts, alkaline earth metal salts, ammonium salts or salts of organic ammonium ions. The monomer can preferably be a monomer comprising at least one acid group selected from the group consisting of carboxylic acid, sulfonic acid, phosphoric acid or phosphonic acid groups.

Examples of a suitable further monomer having carboxylic acid groups encompass $C_3$-$C_{12}$ monoethylenically unsaturated monocarboxylic or dicarboxylic acids and anhydrides or salts thereof, for example acrylic acid, methacrylic acid, (meth)acrylic anhydride, crotonic acid, maleic acid, maleic anhydride, fumaric acid, itaconic acid, mesaconic acid, citraconic acid or methylenemalonic acid and ammonium or alkali metal salts thereof. The acids can be used in entirely or partly neutralized form.

Examples of a suitable further monomer having a phosphoric acid or phosphonic acid group encompass monoethylenically unsaturated phosphonic esters or (poly)phosphoric esters and salts thereof, for example vinylphosphonic acid or esters of hydroxyethyl, hydroxypropyl or hydroxybutyl (meth)acrylate with (poly)phosphoric acid and alkali metal and ammonium salts thereof, monovinyl phosphate, allylphosphonic acid, monoallyl phosphate, 3-butenylphosphonic acid, mono-3-butenyl phosphate, mono(4-vinyloxybutyl) phosphate, mono(2-hydroxy-3-vinyloxypropyl) phosphate, mono(1-phosphonoxymethyl-2-vinyloxyethyl) phosphate, mono(3-allyloxy-2-hydroxypropyl) phosphate, mono-2-(allyloxy-1-phosphonoxymethylethyl) phosphate, 2-hydroxy-4-vinyloxymethyl-1,3,2-dioxaphosphole, 2-hydroxy-4-allyloxymethyl-1,3,2-dioxaphosphole. It is also possible to use salts and/or esters, in particular $C_1$-$C_8$-monoalkyl, dialkyl and optionally trialkyl esters of phosphoric acid and/or monomers comprising phosphonic acid groups.

Examples of a suitable further monomer having sulfonic acid groups encompass monoethylenically unsaturated sulfonic acids and salts thereof, for example vinylsulfonic acid, 2-acrylamido-2-methylpropanesulfonic acid, 2-acrylamidomethyldodecylsulfonic acid, 2-(meth)acryloxyethanesulfonic acid, 3-(meth)acryloxypropanesulfonic acid, allyloxybenzenesulfonic acid, vinylbenzenesulfonic acid, vinyltoluenesulfonic acid, allylsulfonic acid, methallylsulfonic acid and their corresponding ammonium and alkali metal salts.

Suitable further monomers are also esters, amides and imides of monoethylenically unsaturated monocarboxylic or dicarboxylic acids, in particular of the abovementioned monoethylenically unsaturated $C_3$-$C_{12}$-carboxylic acids, in particular $C_1$-$C_{40}$, preferably $C_1$-$C_{22}$, particularly preferably $C_2$-$C_{12}$ esters, amides or imides. The substituents can here also bear further heteroatoms. Dicarboxylic acids can also be present in the form of their monoesters or monoamides, for example as $C_1$-$C_4$ monoesters. The amides and imides can be present in N-monoalkylated or optionally N,N-dialkylated form.

Esters can be, in particular, esters of (meth)acrylic acid, in particular (meth)acrylic esters having aliphatic or cycloaliphatic ester groups, in particular $C_1$-$C_{22}$, preferably $C_2$-$C_{12}$ ester groups. Examples of such compounds encompass methyl (meth)acrylate, ethyl (meth)acrylate, propyl (meth)acrylate, isopropyl (meth)acrylate, 1-butyl (meth)acrylate, isobutyl (meth)acrylate, tert-butyl (meth)acrylate, pentyl (meth)acrylate, isoamyl (meth)acrylate, hexyl (meth)acrylate, heptyl (meth)acrylates, isodecyl (meth)acrylate, lauryl (meth)acrylate, stearyl (meth)acrylate, behenyl (meth)acrylate, cyclohexyl (meth)acrylate, 4-tert-butylcyclohexyl (meth)acrylate, isobornyl (meth)acrylate, 2-ethylhexyl (meth)acrylate, 2-propylheptyl (meth)acrylate or citronellol (meth)acrylate.

The ester groups can also comprise heteroatoms, in particular O and/or N atoms. Examples of such esters encompass hydroxyethyl (meth)acrylate, hydroxypropyl (meth)acrylate, hydroxybutyl (meth)acrylate, ethyl diglycol (meth)acrylate, hydroxypropyl carbamate (meth)acrylate, phenyl (meth)acrylate, benzyl (meth)acrylate, 2-phenylethyl (meth)acrylate, 3-phenylpropyl (meth)acrylate, ureido (meth)acrylate, acetoacetoxyethyl (meth)acrylate, hydroxyethylpyrrolidone (meth)acrylate, tert-butylaminoethyl (meth)acrylate, diethylaminoethyl (meth)acrylate, dimethylaminoethyl (meth)acrylate. Examples of preferred esters of (meth)acrylic acid encompass hydroxyethyl (meth)acrylate, hydroxypropyl (meth)acrylate and hydroxybutyl (meth)acrylate.

The alcohol components in the (meth)acrylic esters can also be alkoxylated alcohols. Here, mention may be made of, in particular, alkoxylated $C_1$-$C_{18}$-alcohols which comprise from 2 to 80 mol of ethylene oxide, propylene oxide, butylene oxide or mixtures thereof. Examples of such alkoxylated products encompass methylpolyglycol (meth)acrylate or (meth)acrylic esters of $C_{13}$/$C_{15}$ oxo alcohol reactive with 3, 5, 7, 10 or 30 mol of ethylene oxide, or mixtures thereof.

Further examples of esters, amides or imides encompass monoethyl maleate, diethyl maleate, dimethyl maleate, N-substituted maleimides such as N-methylmaleimide, N-phenylmaleimide and N-cyclohexylmaleimide, acrylamide, methacrylamide, N-methyl(meth)acrylamide, N,N-dimethyl(meth)acrylamide, N,N-diethylacrylamide, N-isopropyl(meth)acrylamide, N-methylol(meth)acrylamide, N-hydroxyethyl(meth)acrylamide, N-tert-butyl(meth)acrylamide, N-tert-octyl(meth)acrylamide, N-(1-methylundecyl)(meth)acrylamide, 10-acrylamidoundecanoic acid, N-cyclohexyl(meth)acrylamide, diacetoneacrylamide, dimethylaminoethyl(meth)acrylamide, dimethylaminopropyl(meth)acrylamide, N,N-dimethyl-N-(meth)acrylamidopropyl-N-(3-sulfopropyl)ammonium betaine, (meth)acryloylmorpholine.

Monomers bearing amino or imino groups can also be present in protonated form or in the form of their quaternized salts, for example by quaternization with methyl chloride, dimethyl sulfate or diethyl sulfate. The monomers can also have been reacted with propane sultone to form the corresponding betaines.

Further monomers which are likewise suitable are monomers comprising N-vinyl groups, for example N-vinylpyrrolidone, N-vinylcaprolactam, N-vinyl-N-methylacetamide, N-vinylimidazole, 2-methyl-1-vinylimidazole, quaternized N-vinylimidazole derivatives, for example 1-vinyl-3-methylimidazolium chloride or methosulfate, N-vinyl-1,2,4-triazole, N-vinylcarbazole, N-vinylformamide, 2-methyl-1-vinylimidazoline.

Suitable further monomers are $C_1$-$C_{24}$ esters of vinyl alcohol and monocarboxylic acids, for example vinyl formate, vinyl acetate, vinyl propionate, vinyl-n-butyrate, vinyl laurate, vinyl stearate, or vinyl esters of Koch acids, for example of 2,2-dimethylpropanoic acid, 2,2-dimethylbutanoic acid, 2,2-dimethylpentanoic acid, 2-ethyl-2-methylbutanoic acid, neononanoic acid, neodecanoic acid.

Vinyl or allyl ethers such as methyl vinyl ether, ethyl vinyl ether, propyl vinyl ether, isobutyl vinyl ether, tert-butyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, hydroxybutyl vinyl ether, 2-(diethylamino)ethyl vinyl ether, 2-(di-n-butylamino)ethyl vinyl ether or methyl diglycol vinyl ether and the corresponding allyl compounds are also suitable.

Further suitable monomers are unsaturated alcohols such as 3-buten-1-ol, 2-buten-1-ol, allyl alcohol, isoprenol, prenol, methallyl alcohol.

Further suitable monomers are alkoxylated vinyl, allyl, methallyl or isoprenyl ethers having 1-150 mol of EO units or mixtures of EO and PO units.

Suitable further monomers are likewise N-allyl compounds, for example diallylamine, N,N-dimethyl-N,N-diallylammonium chloride.

Suitable further monomers are also α,β-monoethylenically unsaturated nitriles having from 3 to 10 carbon atoms, for example acrylonitrile, methacrylonitrile, fumaronitrile, maleonitrile.

Suitable further monomers are additionally vinylaromatic monomers such as styrene, vinyltoluene or α-methylstyrene. Further styrene derivatives conform to the general formula IV

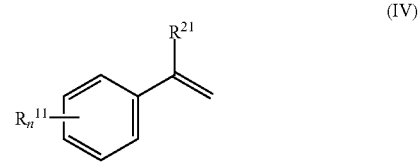

(IV)

where $R^{11}$ and $R^{21}$ are each hydrogen or $C_1$-$C_8$-alkyl and n is 0, 1, 2 or 3. The aromatic ring can additionally bear heteroatoms, for example 2- and 4-vinylpyridine.

Suitable further monomers are additionally halogenated alkenes, for example vinyl chloride, vinylidene chloride, trifluoroethylene, tetrafluoroethylene and also acrolein, methacrolein.

The further monomers can also be monomers having a crosslinking effect. Examples of suitable crosslinking further monomers encompass molecules having a plurality of ethylenically unsaturated groups, for example di(meth)acrylates such as ethylene glycol di(meth)acrylate, 1,4-butanediol di(meth)acrylate or hexanediol di(meth)acrylate, or poly(meth)acrylates such as trimethylolpropane tri(meth)acrylate, pentaerythritol tri(meth)acrylate or else di(meth)acrylates of oligoalkylene or polyalkylene glycols, e.g. diethylene, triethylene or tetraethylene or dipropylene, tripropylene or tetrapropylene glycol di(meth)acrylate. Further examples encompass divinylbenzene, divinylethyleneurea, vinyl (meth)acrylate, allyl (meth)acrylate, isoprenyl (meth)acrylate, prenyl (meth)acrylate, dihydrodicyclopentadienyl acrylate, dicyclopentadienyl (meth)acrylate or butanediol divinyl ether. Diallyl and oligoallyl or vinyl ethers of polyhydroxy compounds, for example ethylene glycol divinyl ether, butanediol divinyl ether, 1,4-cyclohexanedimethanol divinyl ether, diethylene glycol divinyl ether, triethylene glycol divinyl ether, pentaerythritol triallyl or tetraallyl ether, are likewise suitable. Oligoallylamines, for example triallylamine or tetraallylammonium chloride are likewise suitable. Diallyl and oligoallyl esters of polycarboxylic acid, for example diallyl phthalate, diallyl maleate, triallyl trimellitate, divinyl esters of dicarboxylic acids such as succinic acid and adipic acid are likewise suitable. Di(meth)acrylamides, tri(meth)acrylamides or oligo(meth)acrylamides, for example N,N'-methylenebis (meth)acrylamide, are likewise suitable. The content of crosslinking monomers is generally from 0 to 20 mol %, based on the total number of all monomers, preferably from 0.1 to 10 mol % and particularly preferably from 0.2 to 5 mol %. The polymers according to the invention very particularly preferably do not comprise any crosslinking monomers.

Examples of preferred monoethylenically unsaturated further monomers encompass styrene, butadiene, methyl (meth)acrylate, ethyl acrylate, dibutyl maleate, methyl-alpha-cyanoacrylate, acrylonitrile, acrylic acid, methacrylic acid, maleic acid/anhydride, itaconic acid, vinylphosphonic acid, N-vinylpyrrolidone, N,N-dimethyl-N,N-diallylammonium chloride, acrylamide, vinylimidazole, vinyl acetate, allylsulfonic acid, 2-acrylamido-2-methylpropanesulfonic acid, particularly preferably acrylic acid, methacrylic acid, methyl (meth)acrylate, maleic acid/anhydride, (iso)prenyl alkoxylate, (meth)allyl alkoxylate or hydroxybutyl vinyl ether alkoxylate. Very particular preference is given to acrylic acid, methacrylic acid, (meth)acrylate, maleic acid/anhydride, (iso)prenyl alkoxylate, (meth)allyl alkoxylate or hydroxybutyl vinyl ether alkoxylate.

In a further preferred embodiment of the polymers according to the invention, acrylic acid is comprised in the polymer as at least one further monomer which is different from the compounds of the general formula (I). In this case, particular preference is given to no further monomers apart from unsaturated compounds of the general formula (I) and acrylic acid being comprised.

In a further preferred embodiment of the polymers according to the invention, methacrylic acid is comprised in the polymer as at least one further monomer which is different from the compounds of the general formula (I). In this case, particular preference is given to no further monomers apart from unsaturated compounds of the general formula (I) and methacrylic acid being comprised. The compounds of the general formula (I) according to the invention can, in contrast to the corresponding vinyl ether compounds, readily be copolymerized with (meth)acrylic acid and derivatives thereof.

In a further preferred embodiment of the polymers according to the invention, maleic acid/anhydride is comprised in the polymer as at least one further monomer which is different from the compounds of the general formula (I). In this case, particular preference is given to no further monomers apart from unsaturated compounds of the general formula (I) and maleic acid/anhydride being comprised.

The polymers according to the invention can, even when they are prepared only from particular compounds of the general formula (I) as monomers and/or further monomers different from the compounds of the general formula (I), of course nevertheless comprise small amounts of initiators or chain transfer agents because of the way in which they are prepared.

In further preferred embodiments of the polymers according to the invention, no further monomers apart from unsaturated compounds of the general formula (I), acrylic acid and methacrylic acid or acrylic acid and maleic acid/anhydride or methacrylic acid and maleic acid/anhydride are comprised.

In a further preferred embodiment of the polymers according to the invention, no further monomers apart from unsaturated compounds of the general formula (I), acrylic acid, methacrylic acid and maleic acid/anhydride are comprised.

In general, the polymers according to the invention comprise from 5 to 99.9% by weight of unsaturated compounds of the general formula (I), in particular from 8 to 99.9% by weight, preferably from 10 to 99.9% by weight, more preferably from 30 to 99.5% by weight, particularly preferably from 50 to 99% by weight and very particularly preferably from 55 to 96% by weight, in each case based on the total amount of monomers in the polymer.

In a preferred embodiment of the invention, the polymers according to the invention comprise from 5 to 99.9% by weight of unsaturated compounds of the general formula (I), preferably compounds (Ia), particularly preferably compounds (Ib), and from 95 to 0.1% by weight of monoethylenically unsaturated further monomers, preferably from 10 to 99.9% by weight of compounds (I) and from 90 to 0.1% by weight of monoethylenically unsaturated further monomers, particularly preferably from 30 to 99.9% by weight of compounds (I) and from 70 to 0.1% by weight of monoethylenically unsaturated further monomers, in each case based on the total amount of monomers comprised, with the proviso that the total amount of compounds of the formula (I) and monoethylenically unsaturated further monomers is in particular at least 80% by weight, preferably at least 90% by weight, particularly preferably at least 95% by weight. Very particular preference is given to no other monomers apart from compounds of the formula (I) and monoethylenically unsaturated further monomers being comprised.

In a further preferred embodiment, the polymers according to the invention comprise from 1 to 99.9% by weight, preferably from 10 to 99.9% by weight, particularly preferably from 30 to 99.9% by weight, of unsaturated compounds of the general formula (I), preferably compounds (Ia), particularly preferably compounds (Ib), and a total of from 99 to 0.1% by weight, preferably from 90 to 0.1% by weight, particularly preferably from 70 to 0.1% by weight, of further monomers, where the amounts mentioned are in each case based on the total amount of monomers in the polymer and the further monomers comprise at least one monomer selected from the group consisting of (1) monoethylenically unsaturated monomers comprising carboxylic acid groups and anhydrides or salts thereof, for example acrylic acid, methacrylic acid, maleic acid or maleic anhydride, (2) monoethylenically unsaturated monomers comprising phosphoric or phosphonic acid groups and salts thereof, for example esters of hydroxyethyl, hydroxypropyl or hydroxybutyl (meth)acrylate with (poly)phosphoric acid, (3) monoethylenically unsaturated monomers comprising sulfonic acid groups and salts thereof, for example vinylsulfonic acid or 2-acrylamido-2-methylpropanesulfonic acid, (4) hydroxyalkyl (meth)acrylates, for example hydroxyethyl acrylate or hydroxypropyl acrylate, (5) monoethylenically unsaturated monomers comprising polyalkoxy groups, for example (iso)prenyl alkoxylate, (meth)allyl alkoxylate, hydroxybutyl vinyl ether alkoxylate or (meth)acrylic acid alkoxylates.

In a further preferred embodiment, the polymer according to the invention comprises at least two different further monomers, in particular at least two different further monoethylenically unsaturated monomers, in addition to at least one compound (I), preferably (Ia), particularly preferably (Ib). The further monomers preferably comprise at least one monoethylenically unsaturated monomer comprising acid groups, preferably a monomer selected from the above-described groups (1), (2) and (3), and a monoethylenically unsaturated monomer comprising OH groups and/or polyalkoxy groups, preferably a monomer selected from the above-described groups (4) and (5).

In this preferred embodiment, the amount of compounds (I), preferably compounds (Ia), particularly preferably compounds (Ib), is generally from 1 to 99.9% by weight, preferably from 10 to 99.9% by weight, particularly preferably from 30 to 99.9% by weight, and the amount of the two further monomers together is from 99 to 0.1% by weight, preferably from 90 to 0.1% by weight, particularly preferably from 70 to 0.1% by weight, in each case based on the total amount of all monomers in the polymer.

In a preferred embodiment of the invention, the polymer according to the invention comprises from 70 to 99% by weight, preferably from 80 to 98% by weight, of at least one compound (Ib) and from 1 to 30% by weight, preferably from 2 to 20% by weight of (meth)acrylic acid.

The polymers according to the invention have, depending on the intended use of the composition of the invention, molar mass distributions which can vary over a wide range. A person skilled in the art will select a suitable molar mass depending on the desired use of the polymer. The number average molar mass $M_n$ can be, for example, from 1000 g/mol to 1 000 000 g/mol.

In particular, the polymers according to the invention have a molar mass distribution (molecular weight distribution) having a number average $M_n$ of from 1000 to 200 000 g/mol, preferably from 2000 to 180 000 g/mol, particularly preferably from 3000 to 150 000 g/mol, in particular from 5000 to 100 000 g/mol and for example from 10 000 g/mol to 50 000 g/mol.

The molar mass distribution is determined by GPC.

The preparation of the polymers can, in particular, be carried out by means of free-radical polymerization of unsaturated compounds of the general formula (I), preferably (Ia), particularly preferably (Ib), and optionally further monomers. Processes for the free-radical polymerization of monomers are known in principle to those skilled in the art.

The free-radical polymerization can be carried in bulk or preferably in solution. In the case of polymerization in solution, the choice of the solvent is guided by the type of unsaturated compounds (I) and optionally of further monomers, in particular depending on the hydrophilicity of the monomers. The polymerization can, in particular, be carried out in polar solvents, preferably in aqueous solution. Aqueous solutions in which the solvent or solvent mixture used comprises at least 50% by weight of water can preferably be used. In addition, further, water-miscible solvents can be present, e.g. alcohols. An aqueous solvent preferably comprises at least 70% by weight of water, particularly preferably at least 90% by weight of water. For example, the polymerization can be carried out exclusively in water.

To start the polymerization, initiators for free-radical polymerization are used in a manner known in principle. Here, the initiators can be, in particular, thermal polymerization initiators, for example peroxides or azo initiators. The polymerization temperature will be selected by a person skilled in the art as a function of the desired result. A temperature of from 50° C. to 100° C. has been found to be useful, in particular in the polymerization in aqueous solution. However, the free-radical polymerization can also be carried out by means of other techniques; the polymerization can be, for example, a photopolymerization using photoinitiators.

The pH during the course of the polymerization in aqueous solution can be selected by a person skilled in the art as a function of the desired result. The compounds (I) according to the invention are hydrolysis-stable even in the acid range. This distinguishes them from the analogous vinyl ether compounds $H_2C\!\!=\!\!CH\!\!-\!\!O\!\!-\!\!R\text{-}(AO)_x$ known in the prior art, which tend to undergo hydrolysis in the acid range, in particular at pH values below 3. This significantly reduces their possible uses. The monomers (I) according to the invention can, optionally together with the further monomers, particularly advantageously be free-radically polymerized in aqueous solution in the acid pH range, in particular at a pH of from 1 to 6, preferably from 1 to 5 and in particular a pH of from 1 to 3.

The free-radical polymerization can, for example, be carried out in a batch process, semibatch process or by means of a continuous process. A suitable continuous process is described, for example, in WO 2009/100956 A2.

Various techniques can be used in the free-radical polymerization of unsaturated compounds (I), preferably compounds (Ia), particularly preferably compounds (Ib), with further monomers, in particular with further monomers comprising acid groups, for example acrylic acid, in aqueous solution.

In one embodiment of the invention, a mixture of the monomers is placed as such or in solution in the reaction vessel and the polymerization is then started, for example by adding a thermal polymerization initiator and increasing the temperature.

In a further embodiment of the invention, a solution of the unsaturated compounds (I) and optionally part of the further monomers and part of a thermal polymerization initiator are placed in the reaction vessel. Not more than 25% by weight of the further monomers should be initially charged in this embodiment. The remaining amount of further monomers and also the remaining amount of the initiator are added after commencement of the polymerization, in particular after heating to the polymerization temperature. Here, a solution of further monomers and a solution of the initiator are preferably metered continuously into the reaction vessel.

In a preferred embodiment of the invention, the unsaturated compounds (I) and the further monomers are gradually introduced into the polymerization reactor which comprises at least a particular amount of solvent, in particular an aqueous solvent.

In this embodiment, only part of the unsaturated compounds (I), the further monomers and the initiator are initially placed in the reaction vessel; here, the amount of the initially charged monomers should not exceed 25% by weight of the total amount, preferably 10% by weight, of the intended total amount of the monomers, and the molar ratio of the initially charged monomers should be selected in accordance with the intended ratio in the polymer. The deviation should in general be not more than +/−20%, preferably not more than +/−10%, of the intended ratio. The ratio of initially charged monomers particularly preferably corresponds to the desired monomer ratio.

The polymerization of the initially charged amounts of the monomers is firstly started. This can be carried out by heating the mixture to the desired polymerization temperature. As an alternative, it is possible to add an initiator which initiates the polymerization even at room temperature, e.g. a redox initiator. The polymerization then starts when the initiator is added to the monomers. After the start of the polymerization, the unsaturated compounds (I) and the further monomers are metered in, preferably as solutions. The monomers can here be introduced separately or a mixture of unsaturated compounds (I) and further monomers, preferably a solution of unsaturated compounds (I) and further monomers in a suitable solvent, can also be metered in. In the latter case, the ratio of the unsaturated compounds (I) to the further monomers is naturally fixed, while in the first case the ratio can also be varied during the polymerization. The initiator is likewise introduced as solution in a suitable solvent.

The metering rate in the addition of the unsaturated compounds (I) and the further monomers should in each case be selected so that an excessively large excess of unpolymerized unsaturated compounds (I) or of unpolymerized further monomers in the reaction vessel is avoided. In particular, an excess of unpolymerized unsaturated compounds (I) should be avoided. The molar ratio of unsaturated compounds (I)/further monomers will hereinafter be referred to as x. The metering rates of the monomers should preferably be selected so that the molar ratio of the monomers running into the reactor deviates by not more than +/−20%, preferably not more +/−10%, of the intended ratio; of course, the total amount of the monomers has to correspond to the desired value.

The above-described embodiment of the polymerization leads to copolymers having particularly good use properties. The advantages are particularly clear in the copolymerization of unsaturated compounds (I) with further monomers comprising acid groups in aqueous solution, for example acrylic acid. Without wishing to be tied to a particular theory, the effect appears to be attributable to the fact that the monomers are incorporated particularly uniformly in the preferred embodiment.

A suitable process for preparing the polymers comprises the steps:
 a. free-radical polymerization of monomers comprising unsaturated compounds of the general formula (II) and

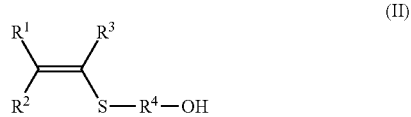

(II)

b. polymer-analogous reaction of a polymer formed in step a. with compounds of the general formula (III)

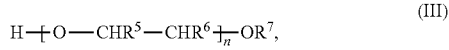

(III)

where the symbols and indices are as defined above.

The binder according to the invention based on calcium sulfate is preferably α-hemihydrate, α/β-hemihydrate, β-hemihydrate, natural anhydrite, synthetic anhydrite, anhydrite obtained from flue gas desulfurization and/or a mixture of two or more thereof.

In a preferred embodiment, the composition of the invention comprises, based on the dry mass, at least 10% by weight, preferably at least 15% by weight, in particular at least 20% by weight, of A) the at least one binder based on calcium sulfate and from 0.005 to 5% by weight, preferably from 0.005 to 3% by weight and in particular from 0.01 to 1% by weight, of B) the at least one polymer.

The contacting of the at least one binder based on calcium sulfate with the at least one polymer can occur in any way known to those skilled in the art. For example, the polymer according to the invention can be added to the make-up water which is subsequently added to the at least one binder based on calcium sulfate. However, it is also possible to mix the components with one another in powder form when both the binder based on calcium sulfate and the polymer according to the invention are present as powder. Furthermore, it is also possible to spray the polymer in liquid form, for example in an organic solvent such as methyl polyethylene glycol, onto the at least one binder based on calcium sulfate which is present in powder form.

The natural form of calcium sulfate which is free of water of crystallization is encompassed by the expression "anhydrite". Apart from the naturally occurring forms, calcium sulfate is a typical by-product of industrial processes, which is then referred to as "synthetic gypsum". A typical example of a synthetic gypsum from industrial processes is that from off gas desulfurization. However, synthetic gypsum can also equally well arise as by-product of phosphoric acid or hydrofluoric acid production processes, with hemihydrate-forms such as $CaSO_4 \times \frac{1}{2} H_2O$ ("hemihydrate") being formed in these cases. Typical gypsum ($CaSO_4 \times 2 H_2O$) can be calcined by separating off the water of crystallization. Products of the various calcination processes are α- or β-hemihydrate. β-Hemihydrate results from rapid heating in open vessels with simultaneous rapid vaporization of water with formation of voids. α-Hemihydrate is produced by dewatering of gypsum in closed autoclaves. The crystal form in this case is relatively dense, which is why this binder requires less water for liquefaction than β-hemihydrate. On the other hand, hemihydrate rehydrates with water to form dihydrate crystals. A time of from a few minutes to hours is usually required for complete hydration of gypsum, resulting in a shortened processing time compared to cements which require from a number of hours to days for complete hydration. In addition, cured gypsum products display pronounced hardness and compressive strength.

According to the invention, the binder according to the invention based on calcium sulfate can preferably be β-hemihydrate because this is readily available and displays numerous advantages from economic points of view. However, these advantages are partly countered by the fact that β-hemihydrate has a greater water requirement during processing in order to obtain flowable slurries at all. In addition, the dried gypsum products produced therefrom tend to display a certain weakness which is attributable to residual amounts of water remaining in the crystal matrix during curing. For this reason, corresponding products display a lower hardness than gypsum products which have been prepared using smaller amounts of make-up water.

For this reason, gypsum is, for the purposes of the present invention, particularly preferably β-calcium sulfate hemihydrate. Compositions according to the invention comprising β-calcium sulfate hemihydrate are here particularly suitable for use in gypsum-based flow screed. Gypsum-based flow screeds have hitherto preferably been produced using binders based on anhydrite or α-hemihydrate. This type of binders comprises modifications of gypsum which have a very low water requirement and are thus very strong binders. However, both components have significant disadvantages in terms of price and in terms of availability compared to β-hemihydrate. The use of β-hemihydrate, on the other hand, has been possible to only a limited extent in the prior art since, owing to the high water requirement, the strengths resulting therefrom are generally too low to produce a flow screed of sufficient quality.

It has surprisingly been found that the composition of the invention is suitable as machine-applicable gypsum-based flow screed. In particular, the binder based on calcium sulfate can here be β-calcium sulfate hemihydrate, with this composition according to the invention being able to be processed like the gypsum-based flow screeds based on anhydrite or α-hemihydrate known from the prior art and here having a comparable or even better mechanical strength, stability and durability.

The present invention thus further provides moldings produced by setting of a composition according to the invention. The molding is particularly preferably a gypsum plasterboard, a gypsum wallboard, a screed or a knifing filler.

In a further embodiment, the present invention provides a composition which can be produced by reacting a water-soluble calcium compound with a water-soluble sulfate compound in the presence of water and the polymer according to the invention obtainable by polymerization of monomers comprising an unsaturated compound of the general formula (I) and subsequently bringing this reaction product into contact with a binder based on calcium sulfate.

Possible water-soluble calcium compounds and water-soluble sulfate compounds in each case in principle also include compounds having only a comparatively low solubility in water, although readily water-soluble compounds which dissolve completely or virtually completely in water are preferred in each case. However, a reactivity sufficient for the reaction in an aqueous medium with the corresponding reaction partner, i.e. the water-soluble calcium compound and the water-soluble sulfate compounds, has to be ensured.

In a preferred embodiment, the water-soluble sulfate compound is, in a first step, mixed with water and the polymer according to the invention so as to give a mixture, preferably present as solution, to which the water-soluble calcium compound is added, preferably as solution, in a subsequent second step. In particular, the water-soluble calcium compound and the water-soluble sulfate compound can be used as aqueous solutions having the following concentrations:
i) from 0.1 to 6 mol/l, preferably from 0.5 to 2 mol/l, in particular from 0.6 to 1 mol/l, of the sulfate compound,
ii) from 0.1 to 10 mol/l, preferably from 3 to 8 mol/l, in particular from 4 to 6 mol/l, of the calcium compound.

The aqueous mixture can comprise one or more further solvents in addition to water. The reaction of the water-soluble calcium compound with the water-soluble sulfate compound in the presence of water and the polymer according to the invention is preferably carried out at a temperature in the range from 5 to 25° C.

The water-soluble calcium compound is, in particular, at least one compound selected from the group consisting of calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium sulfide, calcium tartrate, calcium thiocyanate and calcium aluminate.

The water-soluble calcium compound is preferably at least one compound selected from the group consisting of calcium chloride, calcium nitrate, calcium thiocyanate, calcium acetate and calcium formate.

The water-soluble sulfate compound is, in particular, at least one compound selected from the group consisting of ammonium sulfate, magnesium sulfate, sodium sulfate, potassium sulfate, lithium sulfate, rubidium sulfate, cesium sulfate, sodium hydrogensulfate, potassium hydrogensulfate, lithium hydrogensulfate, rubidium hydrogensulfate, cesium hydrogensulfate and sulfuric acid.

The water-soluble sulfate compound is preferably at least one compound selected from the group consisting of ammonium sulfate, magnesium sulfate, sodium sulfate, potassium sulfate, lithium sulfate, rubidium sulfate and cesium sulfate.

The invention will be illustrated by the examples without the examples restricting the subject matter of the invention.

EXAMPLES

Overview

TABLE 1

|  | Side chain type | Loading | Side chain:loading |
|---|---|---|---|
| Example 1 | VME-135 EO | HEMA-P | 1:4.5 |
| Example 2 | VME-135 EO | Acrylic acid | 1:4.5 |
| Comparative example 1 | VOB-135 EO | HEMA-P | 1:4.5 |
| Comparative example 2 | VOB-135 EO | HEA-P | 1:5.0 |

VME-135 EO: $H_2C=CH-S-CH_2CH_2-(O-CH_2CH_2)_{135}OH$
VOB-135 EO: $H_2C=CH-O-CH_2CH_2CH_2CH_2-(O-CH_2CH_2)_{135}OH$
HEMA-P: Hydroxyethyl methacrylate phosphate
HEA-P: 2-Hydroxyethyl acrylate phosphate Gel Permeation Chromatography (GPC)

The sample preparation for the molecular weight determination was carried out by dissolving copolymer solution in the GPC eluent, so that the polymer concentration in the GPC eluent is 0.5% by weight. This solution was then filtered through a syringe attachment filter having a polyether sulfone membrane and pore size of 0.45 µm. The injection volume of this filtrate was 50-100 µl.

The determination of the average molecular weights was carried out on a GPC instrument from Waters having the model name Alliance 2690 with UV detector (Waters 2487) and RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (by volume)
Flow rate: 0.5 ml/min
Temperature: 50° C.
Injection: 50 to 100 µl
Detection: RI and UV The molecular weights of the copolymers were determined relatively to polyethylene glycol standards from PSS Polymer Standards Service GmbH. The molecular weight distribution curves of the polyethylene glycol standards were determined by means of light scattering. The masses of the polyethylene glycol standards were 682 000, 164 000, 114 000, 57 100, 40 000, 26 100, 22 100, 12 300, 6240, 3120, 2010, 970, 430, 194, 106 g/mol.

Synthesis of the Dispersants According to the Invention
Synthesis of the Monomer According to the Invention (VME-135 EO):
Reaction Scheme for the Preparation of VME-135 EO:

$$\underset{104.17 \text{ g/mol}}{\diagup\!\!\!\diagup\!S\!\diagdown\!\!\diagup\!\!\diagdown\!OH} + 135\ \underset{44.06 \text{ g/mol}}{\triangle\!\!\!O} \longrightarrow$$

$$\underset{6050.92 \text{ g/mol}}{\diagup\!\!\!\diagup\!S\!\diagdown\!\!\diagup\!\!\diagdown\!O\!\diagup\!\!\diagdown\!O\!\diagdown\!\!\!_{135}^{H}}$$

23.4 g (224 mmol) of vinylmercaptoethanol and 120 mg (1.71 mmol) of potassium methoxide together with 50 ml of toluene were placed at 60° C. in a 2 liter autoclave and flooded with nitrogen. The temperature was subsequently increased to 120° C. 1332 g (30.2 mol) of ethylene oxide were introduced over a period of 36 hours. The reaction mixture obtained was stirred further at 120° C. for 12 hours and, after cooling to 100° C., freed of volatile constituents under reduced pressure.

This gave 1388 g of a light-brown solid.

OHN=12.1 mg KOH/g (theory: 9.3 mg KOH/g), PEG content: 2.0% by weight

Example 1

Copolymer of 84% by Weight of VME-135 EO and 16% by Weight of HEMA-P

The experimental apparatus consists of 1000 ml double-wall reactor, thermostat, stirring motor with propeller stirrer, temperature sensor, pH probe and $N_2$ feed conduit. 172.80 g of water and 106.38 g of VME-135 EO are placed in the reactor. $N_2$ is subsequently introduced and the oxygen is displaced. The thermostat is set to T=75° C. and the contents of the reactor are heated.

At about 60° C., 19.79 g of HEMA-P in 104.6 g of water are added. A pH of about 1.0-1.5 is established. 7.05 g of 50% strength NaOH are then added in order to set a pH of about 3. During the addition of the HEMA-P solution, the temperature drops to 50° C. The contents of the reactor are subsequently heated to 60° C. 1.26 g of Wako VA-044 (2,2'-azobis[2-(2-imidazolin-2-yl)propane] dihydrochloride) in 11.3 g of water are then added. After a reaction time of 3 hours, the contents of the reactor are cooled to 25° C.

The yellowish slightly turbid product formed has a pH of about 2.5 and a solids content of 33% by weight. The average molar mass of the polymer (Mw) is 29 000 g/mol. the polydispersity is 1.35.

The results are summarized in table 2.

TABLE 2

Overview of the analytical data

| Example | Mw g/mol | Solids | PD |
|---|---|---|---|
| 1 | 29 000 | 33 | 1.35 |

Example 2

Copolymer of 94.9% by Weight of VME-135 EO and 5.1% by Weight of Acrylic Acid

The experimental apparatus consists of 1000 ml double-wall reactor, thermostat, stirring motor with propeller stirrer, temperature sensor, pH probe and $N_2$ feed conduit. 172.80 g of water and 106.38 g of VME-135 EO are placed in the reactor. $N_2$ is subsequently introduced and the oxygen is displaced. The thermostat is set to T=40° C. and the contents of the reactor are heated.

A solution 1 consisting of 5.78 g of acrylic acid (99.5% strength) and 30.36 g of water and a solution 2 consisting of 1.12 g of Wako VA-044 (2,2'-azobis[2-(2-imidazolin-2-yl)propane] dihydrochloride) in 10.09 g of water are produced.

At about 30° C., 1.8 ml of solution 1 and 0.06 g of 3-mercaptopropionic acid (99% strength) are added. A pH of about 4.0 is established.

0.57 g of 3-mercaptopropionic acid is added to the remaining solution 1.

0.6 ml of solution 2 is introduced into the reactor.

The thermostat is set to T=78° C., and the contents of the reactor are subsequently heated to about 60° C.

At about 60° C. and a pH of about 4.0, the introduction of the remaining solution 1 over a period of 180 minutes at a rate of 11.5 ml/h and the remaining solution 2 over a period of 240 minutes at a rate of 2.7 ml/h are commenced.

10 minutes after commencement of the addition (internal T about 65° C.), the thermostat is set to 70° C.

The mixture is subsequently stirred for another 120 minutes for after-reaction to occur and the contents of the reactor are then cooled to 25° C. The pH of about 3.0 is adjusted to about 8.4 using 6.66 g of NaOH (50% strength).

The yellowish slightly turbid product formed has a pH of about 8.4 and a solids content of 37% by weight. The average molar mass of the polymer (Mw) is 50 000 g/mol. The polydispersity is 1.33.

The results are summarized in table 3.

TABLE 3

Overview of the analytical data

| Example | Mw g/mol | Solids | PD |
|---|---|---|---|
| 2 | 50 000 | 37 | 1.33 |

Comparative Example 1

The experimental apparatus consists of 1000 ml double-wall reactor, thermostat, stirring motor with propeller stirrer, temperature probe, pH probe and $N_2$ feed conduit.

170.0 g of water and 202.12 g of VOB-135 EO are placed in the reactor. $N_2$ is subsequently introduced and the oxygen is displaced. The thermostat is set to T=40° C. and the contents of the reactor are heated.

At about 35° C., 37.59 g of HEMA-P (99.99% strength) in 87.72 g of water are added. A pH of about 1.5 is established. 10.20 g of (50% strength) NaOH are then added in order to set a pH of about 3. The thermostat is set to T=75° C. and the contents of the reactor are heated further. At about 65° C., 2.40 g of Wako VA-044 (2,2'-azobis[2-(2-imidazolin-2-yl)propane] dihydrochloride) in 21.6 g of water are added.

After 15 minutes, the thermostat is set to T=70° C.

After a reaction time of 3 hours, the contents of the reactor are cooled to 20° C. The contents of the reactor are brought to a pH of about 8.1 using 20.16 g of NaOH (50% strength).

The brownish slightly turbid product formed has a solids content of 47% by weight. The average molar mass of the polymer (Mw) is 35 200 g/mol. The polydispersity is 1.57.

TABLE 4

Overview of the analytical data

| Comparative example | Mw g/mol | Solids | PD |
|---|---|---|---|
| 1 | 35 200 | 46.8 | 1.57 |

Comparative Example 2

108.7 g of deionized water and 112.5 g of VOB-135 EO are placed in a glass reactor equipped with stirrer, pH electrode, thermometer, redox electrode, $N_2$ inlet and cooled to a polymerization commencement temperature of 15° C. (initial charge).

In a separate feed vessel, 22.12 g of HEA-P are homogeneously mixed with 199.08 g of deionized water and 9.7 g of (50% strength) NaOH (solution A). In parallel, a 6% solution of a mixture of sodium sulfite, the disodium salt of 2-hydroxy-2-sulfinatoacetic acid and the disodium salt of 2-hydroxy-2-sulfonatoacetic acid (Brüggolit FF6 from Brüggemann GmbH) in water is produced (solution B). While stirring and cooling, 109.53 g of solution A are firstly added to the initial charge and 0.77 g of 3-mercaptopropionic acid (MPA) is then added to the remaining solution A. Subsequently, 0.14 g of 3-mercaptopropionic acid and 0.089 g of iron(II) sulfate heptahydrate ($FeSO_4$) are added in succession to the initial charge solution. This is subsequently set to a starting pH of 5.3 using NaOH (50% strength).

The reaction is started by the addition of 0.75 g of hydrogen peroxide (30% strength solution in water) to the initial charge mixture. At the same time, the introduction of solution A and solution B to the stirred initial charge is commenced. Solution A is introduced over a period of 30 minutes. Solution B is introduced in parallel at a constant metering rate of 13.5 ml/h until no more peroxide can be detected in the solution. The polymer solution obtained is subsequently brought to a pH of 6.5 using 50% strength sodium hydroxide solution.

The copolymer obtained is obtained in a solution which has a solids content of 29.3% by weight. The weight average molar mass of the copolymer is 40 400 g/mol, and the polydispersity is 1.6.

TABLE 5

Overview of the analytical data

| Comparative example | Mw g/mol | Solids | PD |
|---|---|---|---|
| 2 | 40 400 | 29.3 | 1.6 |

Use Examples

The dispersants from the synthesis examples are examined to determine their properties as gypsum plasticizers in a suitable test system.

300 g of β-hemihydrate from flue gas desulfurization are firstly prehomogenized with finely milled calcium sulfate dihydrate (gypsum) as accelerator and sprinkled into 187 g of water. The dispersant is mixed into the make-up water beforehand. The mixture is subsequently allowed to stand for 15 seconds. Stirring with a Hobart mixer for a further 15 seconds at the setting II (285 revolutions per minute) is then commenced. After filling of a cylinder (h=10 cm, d=5 cm), which is lifted after 60 seconds, the spread is determined. The solidification time is determined by the knife cut method (in accordance with DIN EN 13279-2).

TABLE 6

Use examples at a water to gypsum ratio of 0.655.

| Dispersant | FM % | Accelerator [g] | Spread [cm] | Knife cut [min:sec] | Water |
|---|---|---|---|---|---|
| Comparative example 1 | 0.12 | 0.028 | 15.8 | 2:20 | 0.655 |
| Comparative example 2 | 0.12 | 0.150 | 20.5 | 2:15 | 0.655 |
| Example 1 | 0.07 | 0.035 | 20.2 | 2:20 | 0.655 |
| Example 2 | 0.10 | 0.057 | 20.1 | 2:30 | 0.655 |

FM % = Amount of dispersant (solids) used based on the amount of β-hemihydrate in percent by weight.
Accelerator = Amount of finely milled calcium sulfate dihydrate (gypsum) used.

Example 1 according to the invention displays a very good plasticizing effect, which can be seen from the small dosage of dispersant in order to achieve the same spread compared to a polyphosphate ether based on VOB-135 EO and HEA-P (comparative example 2).

Even at virtually twice the dosage compared to example 1, the same plasticizing effect cannot be achieved when using a polyphosphate ether based on VOB-135 EO and HEMA-P (comparative example 1).

Example 2 according to the invention based on acrylic acid also displays a very good plasticizing effect.

The invention claimed is:
1. A composition comprising
A) at least one binder based on calcium sulfate and
B) at least one polymer obtainable by polymerization of monomers comprising an unsaturated compound of the general formula (I)

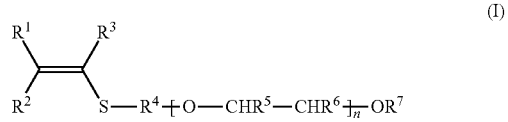

(I)

where
$R^1$, $R^2$, $R^3$ are identical or different and are each, independently of one another, H, or $CH_3$,
$R^4$ is linear or branched $C_1$-$C_{30}$-alkylene,
$R^5$, $R^6$ are identical or different and are each, independently of one another, H, $C_1$-$C_{20}$-alkyl, $C_3$-$C_{15}$-cycloalkyl, aryl, —$CH_2$—O—$C_1$-$C_{20}$-alkyl, or $CH_2$—O—$C_2$-$C_{20}$-alkenyl, where $R^5$ and $R^6$ can together also form a $C_3$-$C_6$-alkylene,
$R^7$ is H, $C_1$-$C_4$-alkyl, or

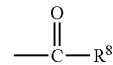

$R^8$ is $C_1$-$C_{22}$-alkyl, or $C_2$-$C_{22}$-alkenyl, and
n is an integer from 2 to 200.

2. The composition according to claim 1, wherein $R^4$ is a $C_2$-$C_4$-alkylene group, $R^5$, $R^6$ are identical or different and are each, independently of one another, a group selected from among H, —$CH_3$, —$CH_2$—$CH_3$, —$C_3$-$C_{11}$-alkyl, $C_{12}$-$C_{22}$-alkyl, phenyl, —$CH_2$—O—$C_1$-$C_{10}$-alkyl, and $CH_2$—O—$C_2$-$C_{10}$-alkenyl, $R^7$ is H or $C_1$-$C_4$-alkyl and n is from 5 to 140.

3. The composition according to claim 1, wherein the unsaturated compounds are unsaturated compounds (Ia)

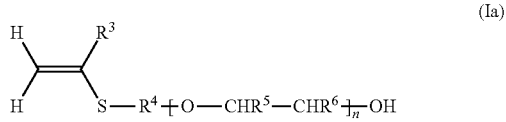

where
$R^3$ is H or methyl,
$R^4$ is a linear or branched $C_2$-$C_{10}$-alkylene group,
$R^5$, $R^6$ are each, independently of one another, H, methyl or ethyl, with the proviso that the sum of the carbon atoms in the radicals $R^5$ and $R^6$ is in each case from 0 to 2 per alkoxy group, and
n is from 5 to 160.

4. The composition according to claim 1, wherein the unsaturated compounds are unsaturated compounds (Ib)

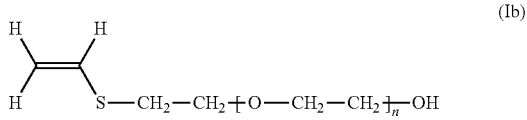

where n is from 20 to 140.

5. The composition according to claim 4, wherein n is from 60 to 140.

6. The composition according to claim 1, wherein the polymer comprises at least one further monomer which is different from the unsaturated compound of the general formula (I) in the polymer.

7. The composition according to claim 6, wherein the at least one further monomer is at least one monoethylenically unsaturated monomer comprising at least one acid group, where the acid group can optionally be entirely or partly neutralized.

8. The composition according to claim 7, wherein the acid group is at least one group selected from the group consisting of carboxylic acid, sulfonic acid, phosphoric acid and phosphonic acid groups.

9. The composition according to claim 8, wherein the polymer comprises at least one monomer having phosphoric or phosphonic acid groups selected from the group consisting of vinylphosphonic acid, esters of hydroxyethyl, hydroxypropyl or hydroxybutyl (meth)acrylate with (poly) phosphoric acid, monovinyl phosphate, allylphosphonic acid, monoallyl phosphate, 3-butenylphosphonic acid, mono-3-butenyl phosphate, mono(4-vinyloxybutyl) phosphate, mono(2-hydroxy-3-vinyloxypropyl) phosphate, mono(1-phosphonoxymethyl-2-vinyloxyethyl) phosphate, mono(3-allyloxy-2-hydroxypropyl) phosphate, mono-2-(allylox-1-phosphonoxymethylethyl) phosphate, 2-hydroxy-4-vinyloxymethyl-1,3,2-dioxaphosphole, 2-hydroxy-4-allyloxymethyl-1,3,2-dioxaphosphole and salts thereof.

10. The composition according to claim 1, wherein from 5 to 99.9% by weight of unsaturated compounds of the general formula (I), based on the total amount of monomers, are comprised in the polymer.

11. The composition according to claim 7, wherein from 5 to 99.9% by weight of unsaturated compounds of the general formula (I) and from 95 to 0.1% by weight of further monoethylenically unsaturated monomers, in each case based on the total amount of monomers, are comprised in the polymer.

12. The composition according to any claim 7, wherein the binder based on calcium sulfate is α-hemihydrate, α/β-hemihydrate, β-hemihydrate, natural anhydrite, synthetic anhydrite, anhydrite obtained from flue gas desulfurization and/or mixtures of two or more thereof.

13. The composition according to claim 7, wherein the composition comprises, based on the dry mass, at least 10% by weight of A) the at least one binder based on calcium sulfate and from 0.005 to 5% by weight of B) the at least one polymer.

14. The composition according to claim 1, wherein from 5 to 99.9% by weight of unsaturated compounds of the general formula (I) and from 95 to 0.1% by weight of further monoethylenically unsaturated monomers, in each case based on the total amount of monomers, are comprised in the polymer.

15. The composition according to claim 1, wherein the binder based on calcium sulfate is α-hemihydrate, α/β-hemihydrate, β-hemihydrate, natural anhydrite, synthetic anhydrite, anhydrite obtained from flue gas desulfurization and/or mixtures of two or more thereof.

16. The composition according to claim 1, wherein the composition comprises, based on the dry mass, at least 10% by weight of A) the at least one binder based on calcium sulfate and from 0.005 to 5% by weight of B) the at least one polymer.

17. A molding produced by setting of a composition according to claim 7.

18. The molding according to claim 17, wherein the molding is a gypsum plasterboard, gypsum wallboard, screed or a knifing filler.

19. A molding produced by setting of a composition according to claim 1.

20. The molding according to claim 19, wherein the molding is a gypsum plasterboard, gypsum wallboard, screed or a knifing filler.

* * * * *